June 23, 1953 M. STUBNITZ 2,642,930
SEAT BOTTOM SPRING
Filed Nov. 1, 1949 3 Sheets-Sheet 1
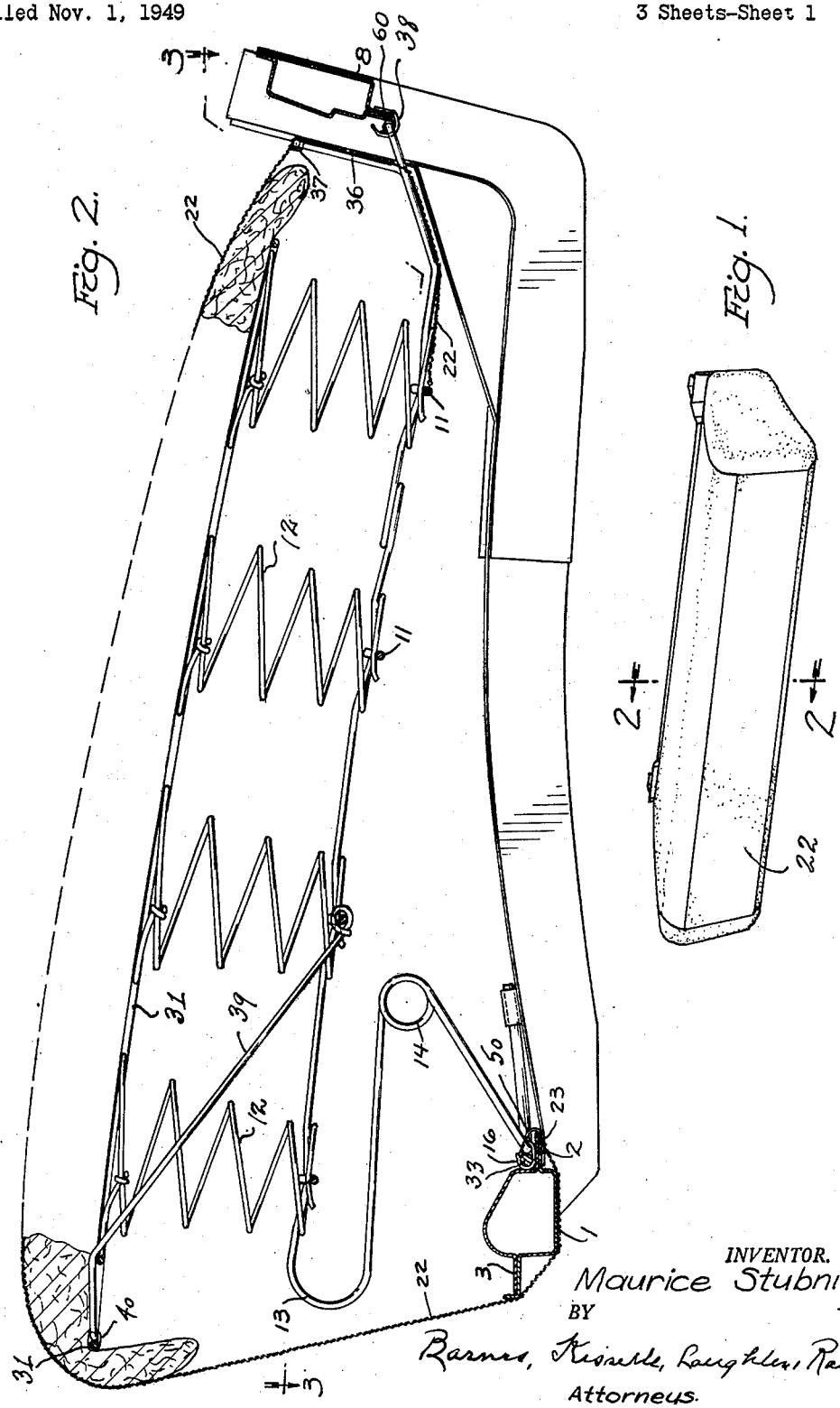

June 23, 1953 — M. STUBNITZ — 2,642,930
SEAT BOTTOM SPRING
Filed Nov. 1, 1949 — 3 Sheets-Sheet 3
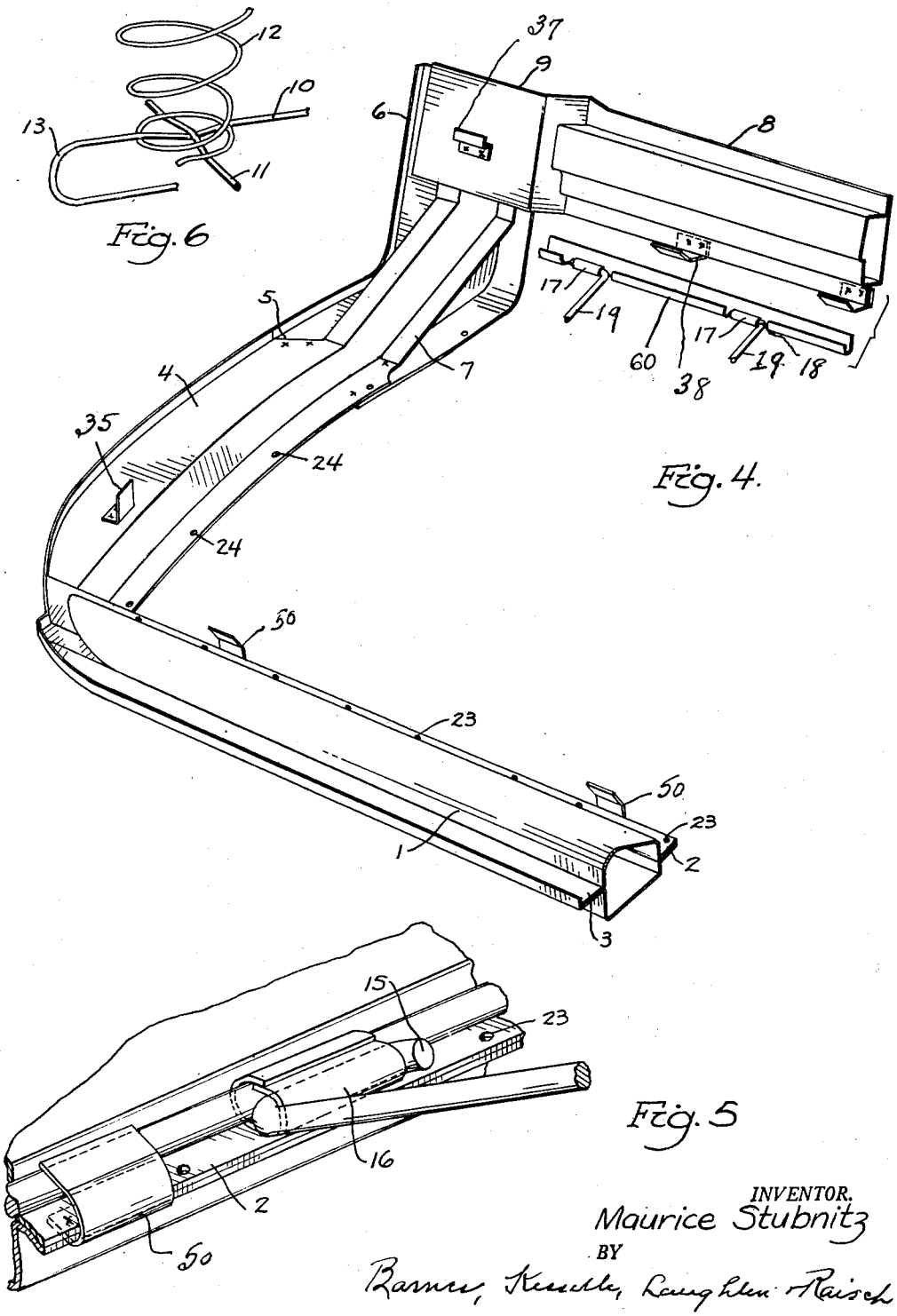
INVENTOR.
Maurice Stubnitz
BY
Barnes, Kisselle, Laughlin Raisch
Attorneys.

Patented June 23, 1953

2,642,930

UNITED STATES PATENT OFFICE 2,642,930

SEAT BOTTOM SPRING

Maurice Stubnitz, Adrian, Mich., assignor to Stubnitz-Greene Spring Corporation, Adrian, Mich., a corporation of Michigan Application November 1, 1949, Serial No. 124,791

3 Claims. (Cl. 155—179)

This invention relates to seat bottom springs. It is the object of the invention to provide a seat bottom spring of minimum cost and maximum comfort. Heretofore it has been the practice in manufacturing springs and equipping automobile bodies with spring seats, to provide a seat bottom cushion which comprises upper and lower rigid border frames with rigid stringer and cross stringer wires on the lower border frame to provide seats for coil springs, usually of the hourglass type. In some of the luxury seat cushions the relatively light coil springs have been used in bags and fitted closely together. This provides more springs, but of a lighter gauge wire, and consequently the seats are softer. This is the so-called "Marshall spring."

With the advent of inflated labor and material costs, automobile manufacturers have been trying to cut corners at all points. To this end there has lately been adopted by some manufacturers the so-called "wavy-wire" or "ziz-zag" type of spring. This saves costs in material and also is economical from the transportation standpoint. These wavy wire strips can be manufactured at one point and shipped knocked-down to the body assembly plant where they are hooked into the seat frame. This type of spring, however, has several deficiencies. It provides a more rigid and less flexible seat and the spring units often break after some usage. It is the object of the present invention to provide a seat bottom spring which is competitive with the wavy wire spring on the cost basis and which, at the same time, will provide a much softer and more comfortable seat cushion than is afforded by the heavy wavy wire springs that is necessary to provide un-invertible bows that reach from the front to the back of the seat.

The present invention comprises a seat spring cushion unit which has a load-supporting coil spring portion which is approximately only one-half the usual thickness and supplementary flexible stringers or spring beams for supplying the other half of the thickness of the spring unit.

Another feature involving the short length springs, the flexible stringers, and the jack spring support at the front is that a self dampening spring is afforded. The vibration amplitude and periods of the coiled spring are different from the vibration amplitude and periods of the spring beams and jack springs. Hence one vibration tends to dampen out the other and thereby avoids unnecessary jolting and throwing.

Another feature is that the stringers or spring beams that extend forwardly and rearwardly may, if desired, be given increased flexibility at the point where the main load comes by providing a coil formation in the stringer itself.

Referring to the drawings:

Fig. 1 is a perspective on a reduced scale of the seat after it has been trimmed.

Fig. 2 is an enlarged cross section on the line 2—2 of Fig. 1.

Fig. 4 is a fragmentary perspective of the seat frame usually provided by the body builder.

Fig. 5 is a detail showing how one of the flexible stringers or spring beams is fastened to the seat frame at the front.

Fig. 6 is a detail view showing how the stringer is knotted into the bottom whirl of the load-supporting spring.

Figure 3:
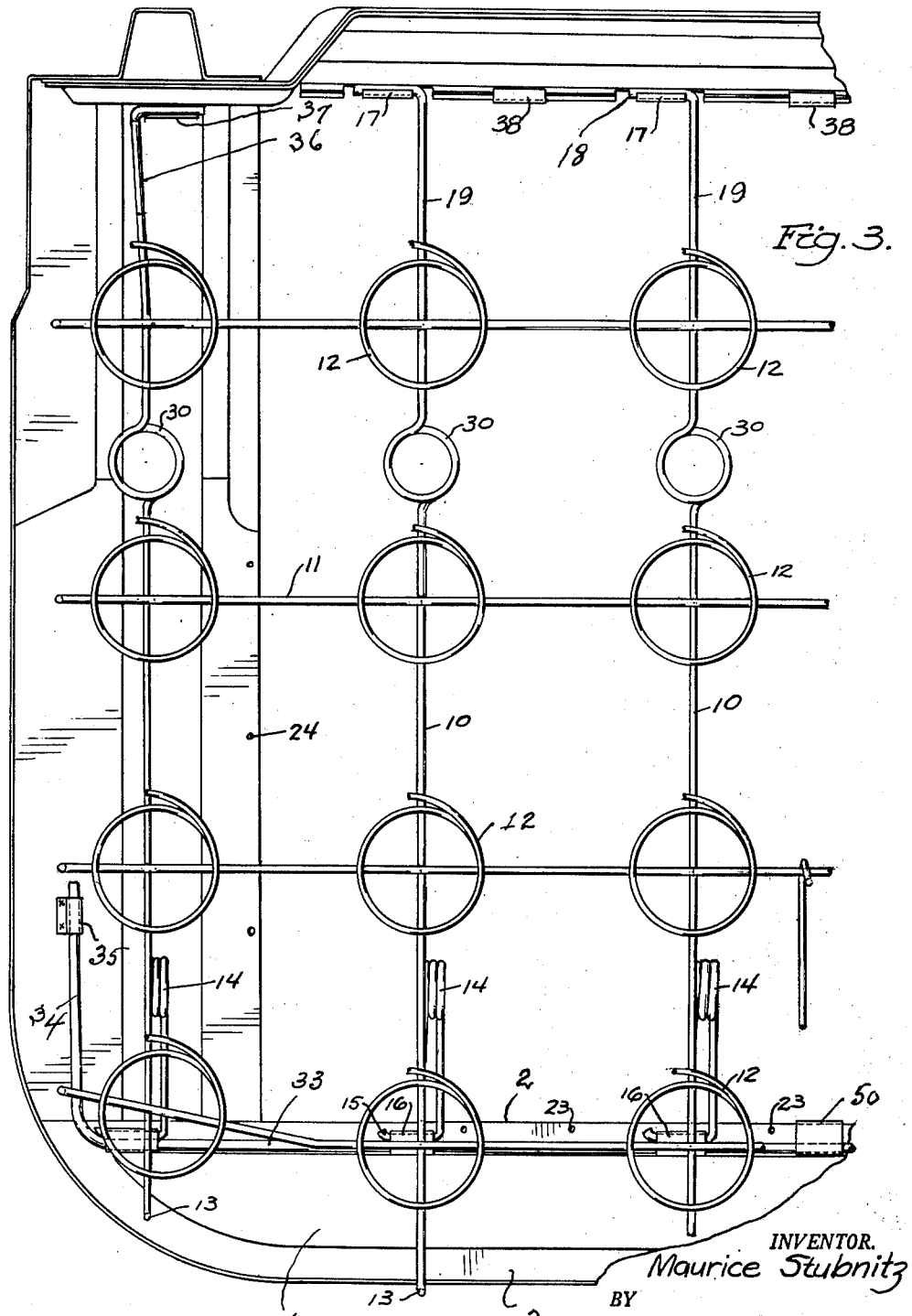
Fig. 3 is a fragmentary plan view of the seat spring unit.

The seat here shown is the front seat which will normally be supported on rollers or gears that in turn travel on tracks or racks so that the seat may be adjusted forwardly or rearwardly. It is desirable in present day automobile body construction to have a foot recess at the rear of the front seat so that the front and rear seats can be placed in closer relation. This lessens the overall body length at the seat level and also serves to carry the rear seat substantially forward of the rear axle to improve riding qualities. My seat permits this to be achieved by hanging the rear of the seat high on the seat frame.

The seat frame comprises a front frame member made of two flanged channels that are matched and welded together to form a box section hollow bar 1, with a shelf 2 at the rear and a shelf 3 at the front. The end of this bar is welded to side bar 4, which comprises two angle bars, such as shown in Fig. 4, welded together at 5. The side bar angles upwardly at the rear to provide an upright portion 6 which is connected with the horizontal portion by means of an oblique brace 7. The rear bar of the frame is considerably elevated over the horizontal portion of the side bars as will be seen in Fig. 2. This rear bar is made up of two angle bars, each of a rough Z cross section, which are matched and welded together to form a hollow box section bar 8 which has at its ends a flat offset portion 9 which is welded to the upright portion 6 of the side bar 4. This offset portion 9 is a continuation of the rear Z bar of the box section rear bar 8.

The seat spring itself is made up of a base of cross stringer wires, the forwardly and rearwardly extending flexible stringers or beams 10, and the transverse stringers 11. I may provide a flat coil 30 in the straight run of the flexible forwardly and rearwardly extending stringers 10. This coil is substantially in the plane of the open network base and gives more flexure at the point of greatest load in the seat cushion, consequently the coil can open up when load is placed on it and materially soften the supporting medium for the rider's body. These stringers are interlaced and knotted into the lower whirl of the coiled upright load-supporting springs 12 as shown best in Fig. 6.

Part of this latticework or network is the forwardly and rearwardly extending flexible stringers 10 which at the front curve downwardly and then rearwardly to form loop 13 which gives additional yield and flexure, and then the spring wire is formed into a jack spring or a safety pin type of spring 14, and the lower leg of this is bent over at the end as at 15. Clips 16 are pinched over the turned over ends 15 of the spring legs and around the base frame wire 33. The tabs 50 are spot welded to the shelf 2 and may be turned over the front base frame wire 33. This base frame wire has turned back legs 34 which can be anchored in place by tabs 35 spot welded to the side seat frame 4. These tabs are turned over and pinched on the legs as shown in Fig. 3. This makes an easy assembly of the spring at the front.

The end spring beams are at the rear provided with hangers 36 which have their upper ends hooked into the rests 37 which are clamped down on the turned over ends. The intermediate spring beams or stringers 10 have the hangers 19 with turned over upper ends that are supported in the separate J bar and the rests 17 of the J bar are clamped over the turned over ends of the intermediate stringers. The J bar is placed in the rests 38 which are spot welded to the rear frame member 8. These rests are then clamped over the J bar 60. The tops of the coil springs 12 are connected to the top and sides by a border wire 31.

The trimming material 22 extends over the rear frame and back and under the same, and then forwardly to the rearmost cross stringer 11 to which the trim material can be fastened by the customary hog rings or clips. At the front the trim material is passed under the shelf 3 and under the front bar 1 and then it is clipped or fastened by hog rings through the holes 23 of the shelf 2. The side trim material (not shown) may be drawn under the side frame bars 4 and 5 and fastened to the same by hog rings passing through openings 24 (see Figs. 3 and 4).

The projecting turned over and up ends 36 of the end flexible stringers 10 are hooked into the Z tabs 37 spot welded to the ends of the seat frame. The J frame bar 60 is supported in the tabs 38 spot welded to the rear seat bar 8. 39 are oblique braces clipped at 40 to the front border wire 31.

As explained in the preamble, the coiled springs 12 have a period and an amplitude of vibration much more frequent and greater than the underspring structure formed by the flexible beams 10, the jack spring 14 and the loops 13. Hence the vibrations tend to dampen out.

What I claim is:

1. A seat spring having a front base wire with turned back ends, a rear channel member slotted to provide rests, intermediate spring wire stringers with hanger portions at the rear received in the rests, two end stringers which have rear hanger portions with turned over ends, all the said stringers at the front ends having jack spring portions with turned over ends clipped to the front base wire, transverse stringers intersecting the end and intermediate spring stringers, short coiled load-supporting springs having their lower ends interlaced with the intersecting wire stringers with the under intersecting wire over the wire of the bottom turn of the load-supporting spring and the over intersecting wire under the wire of said turn, an upper border frame secured to some of the top coils of the load-supporting springs.

2. The combination claimed in claim 1 in which the channel member is a J strip and the rests are pinched over on the turned over ends of the hangers.

3. The combination claimed in claim 1 with a seat frame constructed of flanged channels with the flanges matched and welded together to provide forwardly and rearwardly extending shelves in the front frame member and upwardly and downwardly extending flanges in the rear frame member, and tabs on the rear shelf of the front frame member for pinching over the border wire and tabs on the rear frame member for pinching over the turned over rear ends of the end stringers and over the slotted channel at the rear of the intermediate stringers.

MAURICE STUBNITZ.

References Cited in the file of this patent

UNITED STATES PATENTS

| Number | Name | Date |
|---|---|---|
| 798,752 | Staples | Sept. 5, 1905 |
| 1,915,390 | Steele et al. | June 27, 1933 |
| 2,148,961 | Pleet | Feb. 28, 1939 |
| 2,217,290 | Nordmark | Oct. 8, 1940 |
| 2,291,004 | Stewart et al. | July 28, 1942 |
| 2,570,409 | Van Hove | Oct. 9, 1951 |